United States Patent
Lee et al.

(10) Patent No.: US 7,321,306 B2
(45) Date of Patent: Jan. 22, 2008

(54) WIRELESS SYSTEM TO DETECT PRESENCE OF CHILD IN A BABY CAR SEAT

(75) Inventors: Joseph Kinman Lee, Raleigh, NC (US); Daniel Ray Spach, Pittsboro, NC (US); Prasanna Srinivasan, Morrisville, NC (US); Darren Paul Umstead, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 11/194,179

(22) Filed: Aug. 1, 2005

(65) Prior Publication Data
US 2006/0139159 A1   Jun. 29, 2006

Related U.S. Application Data

(60) Provisional application No. 60/635,371, filed on Dec. 10, 2004.

(51) Int. Cl.
- *B60Q 1/00* (2006.01)
- *G08B 13/14* (2006.01)
- *B60R 21/16* (2006.01)
- *G05D 1/00* (2006.01)

(52) U.S. Cl. ............... 340/572.1; 340/457; 340/457.1; 340/460; 340/573.1; 280/734; 280/735; 701/1; 701/45; 701/46; 701/47; 701/48; 701/49

(58) Field of Classification Search ............. 340/573.1, 340/572.1, 457, 457.1, 459–460; 701/1, 701/45–49; 280/734–735
See application file for complete search history.

(56) References Cited

U.S. PATENT DOCUMENTS

| | | | |
|---|---|---|---|
| 5,838,233 A * | 11/1998 | Hawes et al. ............. | 340/572.5 |
| 5,949,340 A | 9/1999 | Rossi ...................... | 340/573.1 |
| 5,966,070 A | 10/1999 | Thornton .................. | 340/425.5 |
| 6,025,783 A * | 2/2000 | Steffens, Jr. ................ | 340/644 |
| 6,104,293 A * | 8/2000 | Rossi ...................... | 340/573.1 |
| 6,254,127 B1 * | 7/2001 | Breed et al. ................ | 280/735 |
| 6,412,813 B1 * | 7/2002 | Breed et al. ................ | 280/735 |
| 6,438,466 B1 * | 8/2002 | Voigtlaender et al. ......... | 701/1 |
| 6,714,132 B2 * | 3/2004 | Edwards et al. .......... | 340/573.1 |
| 6,768,420 B2 * | 7/2004 | McCarthy et al. ....... | 340/573.1 |
| 6,812,844 B1 * | 11/2004 | Burgess ................... | 340/573.1 |
| 6,922,622 B2 * | 7/2005 | Dulin et al. .................. | 701/45 |
| 6,924,742 B2 * | 8/2005 | Mesina .................... | 340/573.1 |
| 7,089,099 B2 * | 8/2006 | Shostak et al. ............... | 701/32 |
| 7,170,401 B1 * | 1/2007 | Cole .......................... | 340/457 |
| 2003/0142662 A1 | 7/2003 | Mahajan ..................... | 370/352 |

\* cited by examiner

*Primary Examiner*—Benjamin C. Lee
*Assistant Examiner*—Lam Pham
(74) *Attorney, Agent, or Firm*—Joscelyn G. Cockburn; Michael J. Medley; Driggs, Hogg & Fry Co., LPA

(57) ABSTRACT

A wireless system that detects the presence of a child in a safety seat located in the passenger cabin of a vehicle includes a controller responsive to signals generated by sensors monitoring predefined functions of the vehicle, RFID tag device attached to the safety seat and RFID tag reader mounted in the cabin. The system generates control signals which activate an alarm, open the doors of the vehicle and roll down windows if the child is left in the safety seat of an unattended vehicle.

15 Claims, 4 Drawing Sheets

WIRELESS SYSTEM TO DETECT PRESENCE OF CHILD IN A BABY CAR SEAT

This application claims priority date of provisional application No. 60/635,371 filed on Dec. 10, 2004.

BACKGROUND OF THE INVENTION

A. Field of Invention

The invention relates to systems for detecting the presence of occupants of an automobile. In particular, the invention relates to systems that detect the presence of a child in a child's seat without other passengers and the automobile is not in an operational mode. In this case, corrective action is taken to minimize injuries to the child.

B. Prior Art

Most, if not all, jurisdictions within the United States of America require infants and children of certain age to be strapped into a child's seat when the automobile is in motion. Failure to do so is an infraction of the law and could result in the operator paying a fine for the infraction. Even though this law protects infants and children under certain conditions, it could also cause injuries or even death to the infant and children it is suppose to protect. One of the conditions occur when an operator parks the vehicle and forgets to remove the occupant from the child seat. There have been reports in the press that the operator leaves an occupant in the baby seat, the temperature soars or drops and as a result the child or infant suffers injuries. In fact, there have been reports of children and/or infants dying from high temperatures.

To prevent this unintended result, the prior art has provided systems that detect the presence of occupants in an infant seats of unattended vehicles and sound an alarm on such detection. U.S. Pat. Nos. 5,949,340 and 6,714,132 are examples of such prior art systems. Even though the systems provided in these patents work well for intended purposes, the child's seat in these systems requires some type of power which is derived from the vehicle, in which the child's seat is mounted. To obtain power from the vehicle the child's seat is usually wired to the electrical system of the vehicle. This requirement imposes unnecessary restrictions which limits portability of child's seat. In other words, if the child's seat is wired to the vehicle electrical system as is required by U.S. Pat. No. 5,949,340, the seat can only be used with the vehicle to which it is wired.

In view of the prior art limitations, there is a need to provide a more efficient detection system that makes the child's seat portable so that it can be used in different vehicles.

SUMMARY OF THE INVENTION

The system of the present invention is implemented with Radio Frequency Identification, hereafter RFID, technology. The RFID technology is packaged into a RFID tag and a RFID tag reader. The electrical structure of the RFID tag includes an antenna coupled by a switch to the tag electronics. The tag reader includes an electromagnetic wave (EMW) transmit antenna, RFID code receives antenna, associated electronic circuits and an interface to couple the tag reader to the vehicle electronics. The RFID tag is attached to the child's seat also called the safety seat and the tag reader is placed inside the cabin of the vehicle in spaced relation to the RFID tag. Communication between the tag reader and the tag is wireless.

The switch in the RFID tag is pressure sensitive so that the electrical continuity between antenna and associated electrical circuit occurs when a child is placed in the safety seat. Electrical discontinuity occurs when the child is removed from the safety seat. When the RFID tag reader is enabled by the automobile central controller (with the appropriate conditions which will be described subsequently) it will emit electromagnetic wave energy to energize the RFID tag device which in term transmits its RFID code to the RFID tag reader. The RFID tag reader then relays the identified car-seat status information back to the automobile central controller which takes predefined actions to minimize injury to the occupant of the safety seat.

The cost of the RFID components have been steadily decreasing, so the cost of the detection and corrective system will be relatively low.

The RFID system generates its own power, so none is needed from the vehicle power system.

Because the RFID tag is mounted on the safety seat and makes wireless connection with the tag reader, the safety seat is portable and can be moved from one vehicle to the next. Of course, each of the vehicles must be fitted with a compatible RFID tag reader.

These benefits, advantages and others are made available to users of the present invention.

DETAILED DESCRIPTION OF THE EMBODIMENT

Figure 1:
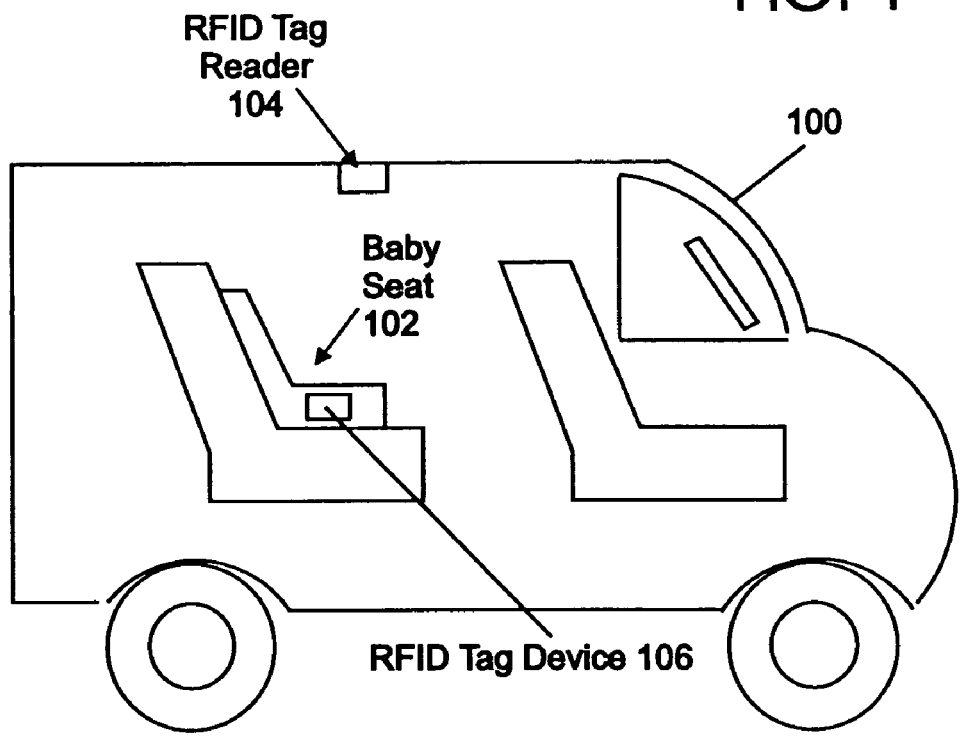
FIG. 1 shows a schematic of a vehicle in which the RFID system of the present invention is deployed.

FIG. 1 shows a pictorial schematic of a vehicle 100 armed with a child safety protection system according to the teachings of the present invention. The child safety protection system monitors occupancy of baby seat 102 and takes corrective action, such as sounding an alarm, unlocking doors or rolling down windows if a child is left in the vehicle. The child safety protection system includes a RFID tag reader 104 deployed in the roof of the vehicle. RFID tag device 106 is mounted to the baby seat 102. Because RFID tag device 106 is mounted to the baby seat 102 it may be transported and used in different vehicles provided with a compatible RFID tag reader 104. It should also be noted that the RFID tag reader can be mounted in other locations in the cabin other than the roof. This is possible because RFID tag reader 104 need not be in line with RFID tag device 106 in order to exchange information. It is only require for the RFID tag reader to be within the close proximity around the RFID tag device.

Figure 2:
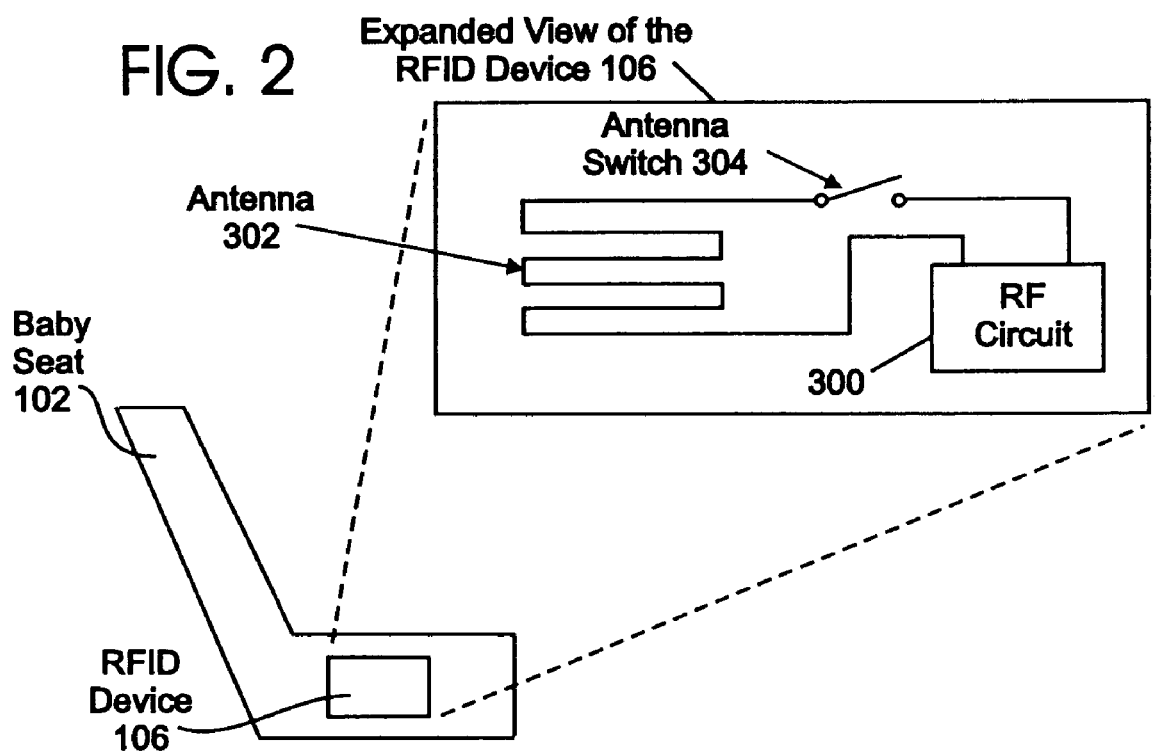
FIG. 2 shows a schematic of the safety seat containing the RFID tag device and the expanded-view of the switchable transmit/receive antenna system of the RFID tag device according to teaching of the present invention.

FIG. 2 shows a schematic of the details of the baby seat 102 and the RFID tag device 106 according to the teachings of the present invention. It should be noted that throughout the different views of the drawings common devices or components are identified by like numerals. It should be noted that throughout this document safety seat and baby seat are used interchangeably. Also, shown in FIG. 2 is an expanded internal structure view of the RFID device 106 with its transmit/receive antenna 302, antenna switch 304, and RF circuit 300. When the antenna switch 304 is closed, electromagnetic wave energy from the RFID tag reader can induce electric current through the transmit/receive antenna 302 to power up the RF circuit 300. Once being powered up, the RF circuit 300 transmits its embedded RFID code through the same transmit/receive antenna 302 for the RFID reader to read. On identifying the receive RFID code, the RFID reader relays the car safety seat status to the Automobile Central Controller (describe subsequently) to take one or all the corrective actions mentioned herein.

Figure 2A:
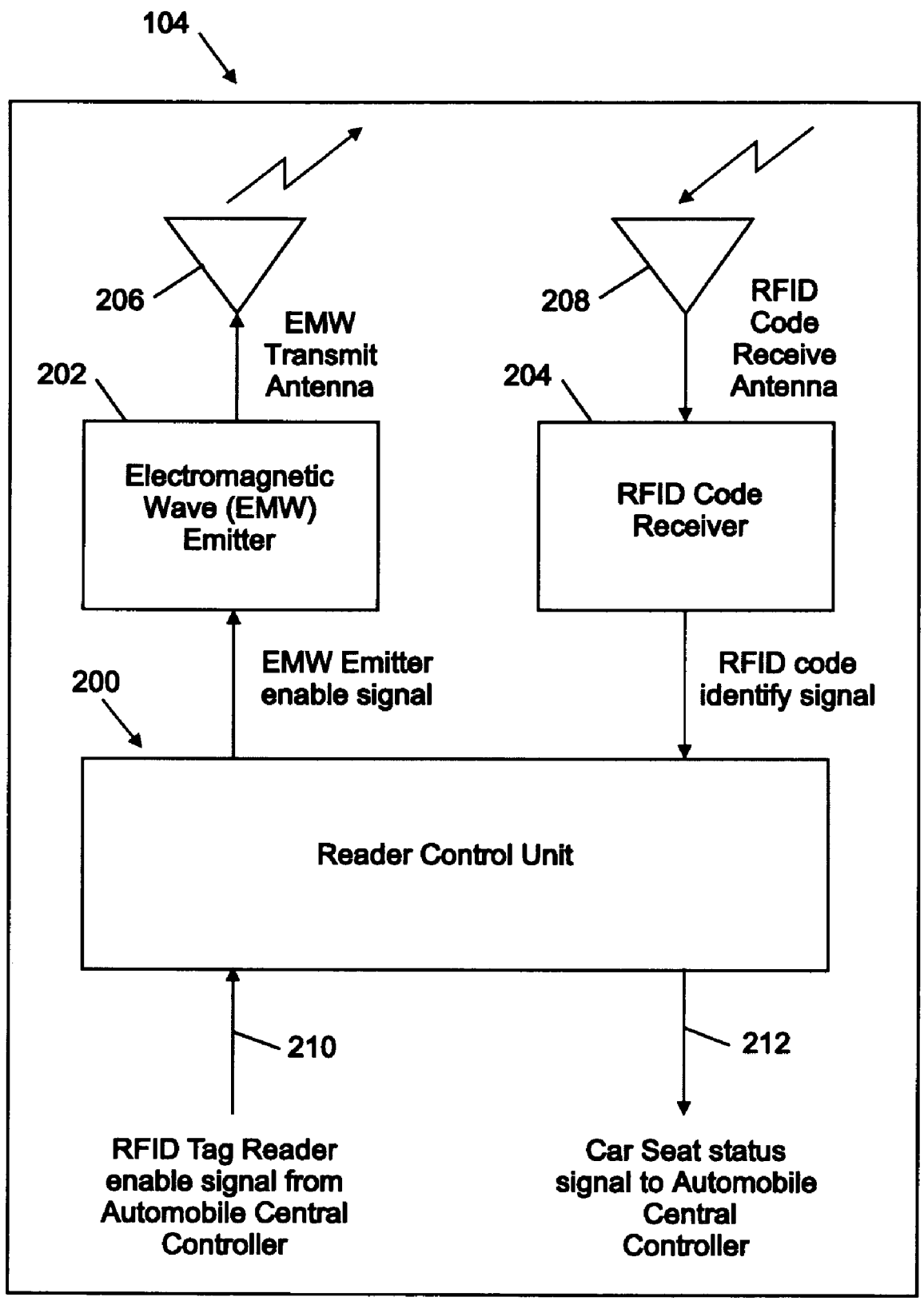
FIG. 2A shows a block diagram of the RFID tag reader according to teaching of the present invention.

FIG. 2A shows a block diagram of the RFID tag reader 104. It includes a Reader Control Unit 200, an Electromagnetic Wave (EMW) Emitter 202, a RFID Code Receiver 204, an EMW Transmit Antenna 206, and a RFID Code Receive Antenna 208. During operation, when the right conditions (describe subsequently) are met, the automobile central controller sends an RFID tag reader enable signal via interface 210 to the Reader Control Unit 200 to enable the EMW Emitter 202 to emit EMW through the EMW Transmit Antenna 206. If antenna switch 304 (FIGS. 2 and 3) is closed, the RFID tag device 106 is energized. Once energized and powered up, the RFID tag device 106 transmits is embedded RFID code as radio signal into the surrounding for the RFID tag reader 104 to read. Once the RFID Code Receiver 204 receives the RFID code through the RFID Code Receive Antenna 208 and identified the correct code, it sends a RFID identity signal to the Reader Control Unit 200 which in term sends the corresponding car-seat status via interface 212 to the Automobile Central Controller (describe subsequently) to take one or all the corrective actions mentioned herein. The function performed by each of the components shown in FIG. 2A are evident from the above description.

Figure 3:
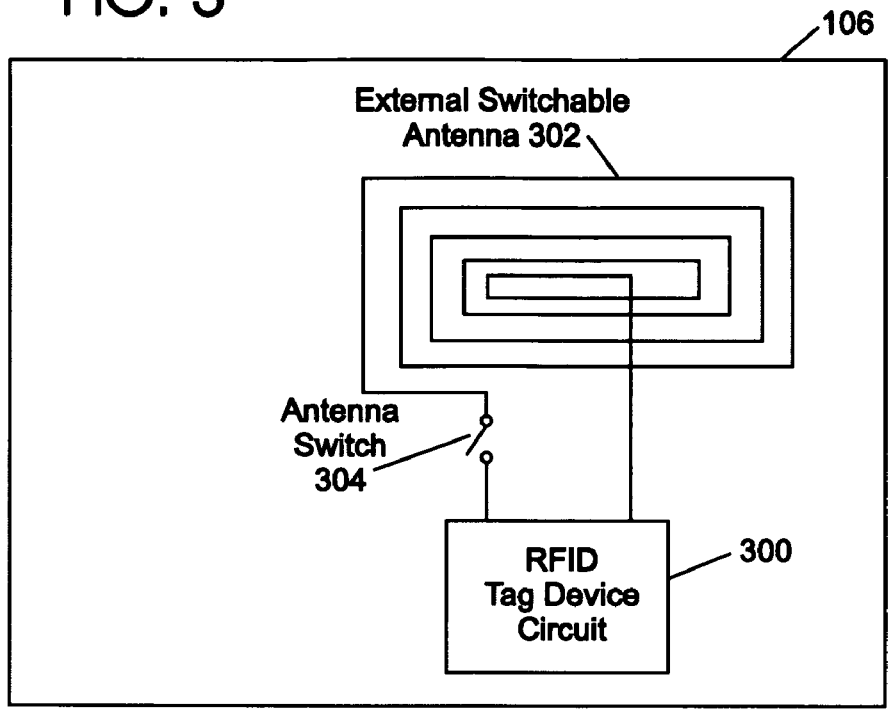
FIG. 3 shows a schematic of the RFID tag according to teachings of the present invention.

FIG. 3 shows a schematic for RFID tag device 106 which is substantially the same as the schematic shown in FIG. 2. RFID tag device 106 includes RFID tag device circuit 300 which is an off the shelf item detail of which will not be given. When a child or infant is sitting in safety seat 102 switch 304 closes and RFID tag device 106 is configured to receive electromagnetic wave energy from RFID tag reader 104 and in turn transmits its ID to said tag reader 104.

Figure 4:
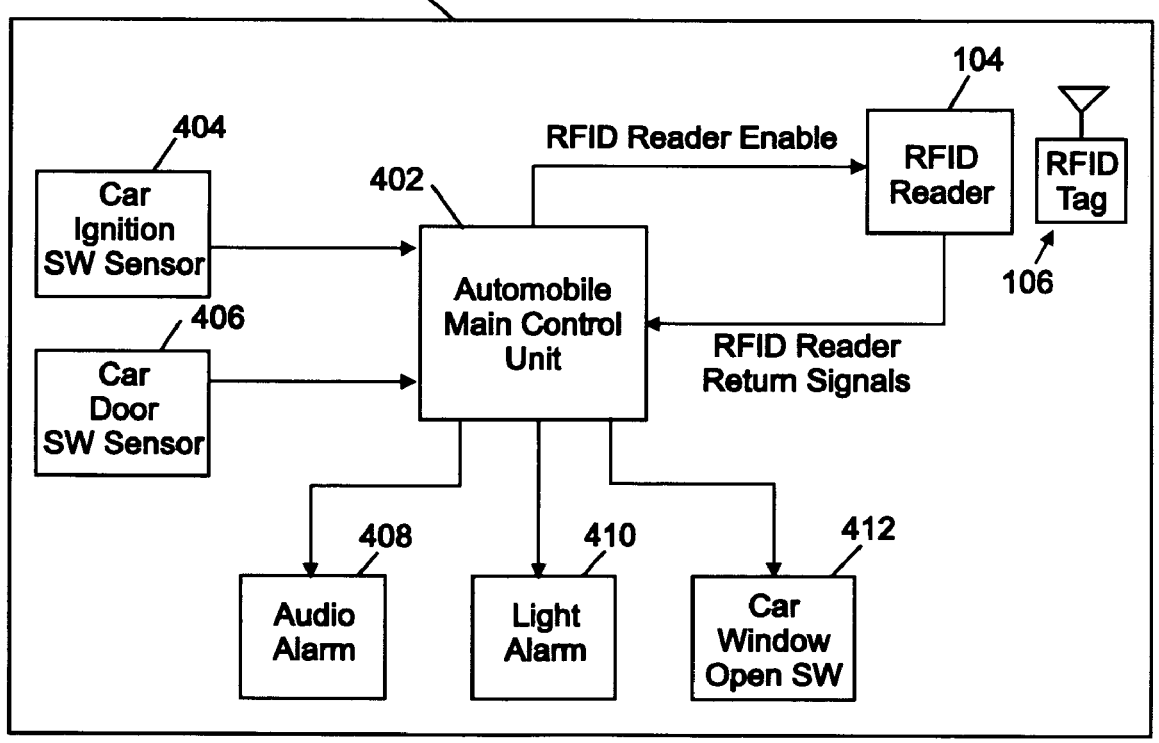
FIG. 4 shows schematic for the control system according to teachings of the present invention.

FIG. 4 shows in block diagram of the overall RFID child safety seat system 400. The diagram shows interaction between RFID tag reader 104 and components in the automobile in which the system is mounted. The system includes the automobile main control unit 402. This main control unit could be a computer in which an application program is executed to carry out the function necessary to implement the child protection according to the teachings of the present invention.

As stated previously, communication between RFID tag device 106 and RFID tag reader 104 is wireless. The automobile main control unit 402 is connected over a separate transmission channel to the car ignition switch (SW) sensor 404, car door switch sensor 406, auto alarm 408, light alarm 410, car window open switch 412 and RFID reader 104. For completeness, the RFID Tag 106 is shown mounted in spaced relationship to the RFID reader. The car switch sensor 404 senses the state of the vehicle ignition switch and indicates whether the switch is on or off. Car door switch sensor 404 senses the state of the doors in the vehicle and forward signal to the main control unit indicating whether the doors are closed or open. The RFID tag reader 104 receives enabling signal from main control unit 402. On receiving this signal the RFID reader 104 is now in the state to emit electromagnetic wave energy to enable and communicate with the RFID tag device 106. The conditions which causes the main control unit 402 to issue a read enable signal to RFID tag reader 104 will be discussed subsequently.

Still referring to FIG. 4 the auto alarm 408, light alarm 410 and the car window open switch 412 are all activated when the control unit 402 determines that a child is left in the infant seat and the car ignition switch is off, the car doors are closed and the RFID reader is returning a positive child engage or child present signal.

Figure 5:
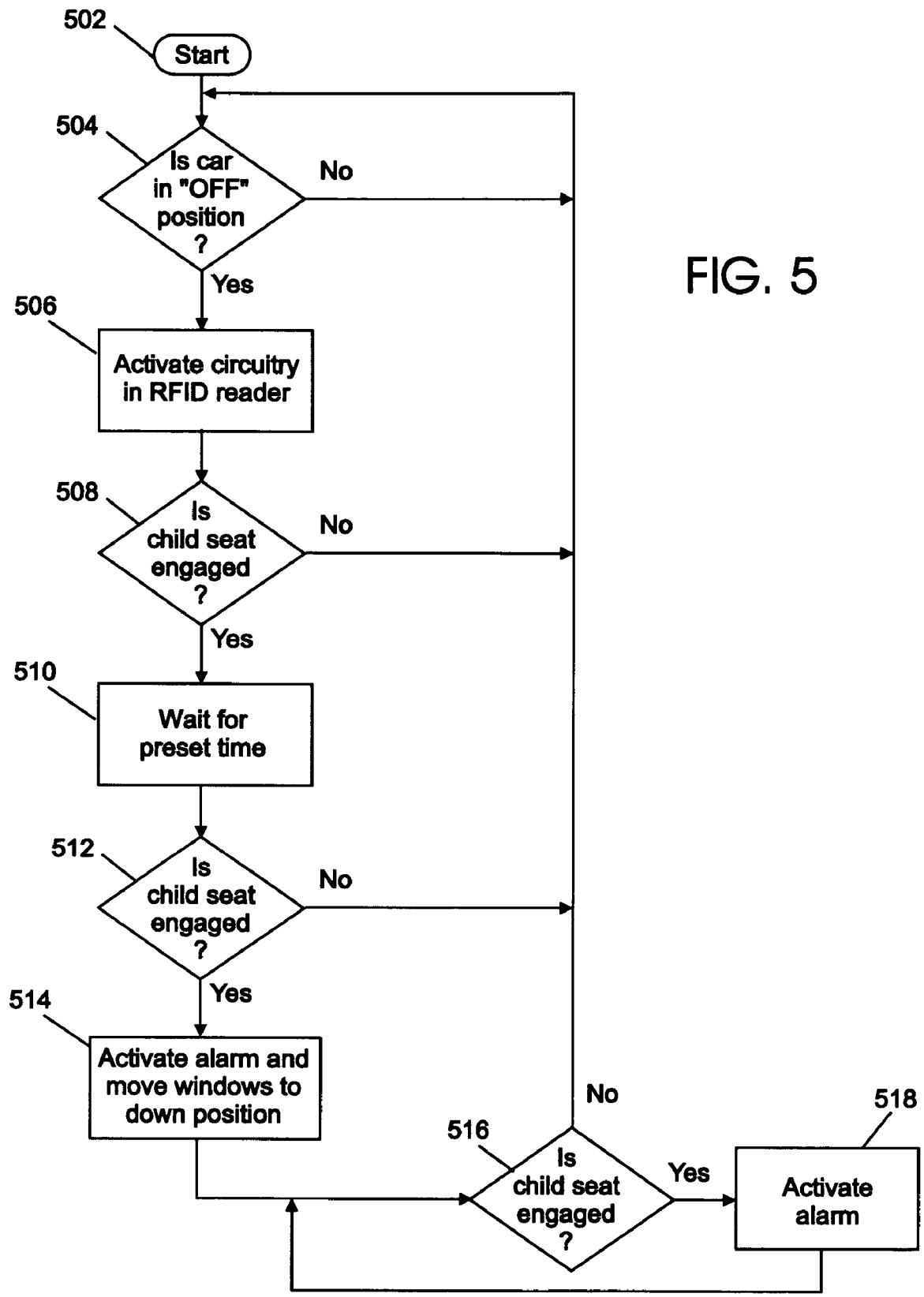
FIG. 5 shows a flow chart of the process or program used in the control unit of FIG. 4.

FIG. 5 shows a flow chart for an application program which can be executed in the main control unit 402 to carry out the steps necessary to implement the child safety protection according to the teachings of the present invention. The program enters at block 502 and descends into block 504 whereat sensor 404 is interrogated to determine the state of the ignition switch. If the car's ignition switch is on, the program loops; otherwise, (i.e. car's ignition off) the program exits along the yes path into block 506 whereat the main control unit 402 outputs the reader enabled signal to enable the RFID tag reader 104 to emit electromagnetic wave energy to its proximity neighborhood. The reader emitted electromagnetic wave energy is collected by external switchable antenna 302 of the RFID device 106. If a child was in the safety seat switch 304 would have been closed and the RFID tag device circuit 300 would have been energized by the received signal. As a consequence a radio RFID tag code is transmitted from the RFID tag device 106. The RFID tag code includes the identity (tag number) of the tag device. On receiving the identity tag code the RFID reader returns a signal to the main control unit 402.

Referring again to FIG. 5 if at block 508 the return control signal indicates the child seat is not engaged (empty) the program exits along the no path and loops. If the signal in 508 indicates that the child seat is engaged (occupied) the program descends along the yes path into block 510 whereat the program waits for a preset time interval and then descends into block 512. In block 512 the program tests if the child seat is engaged. As stated above this is done by the signal that is returned from the RFID reader to control unit 402. If the safety seat is empty the program exits along the no path and loops. If the safety seat is occupied the program exits along the yes path into block 514. In block 514 the controller takes corrective actions, such as activating an audio alarm, light alarm, move windows to down position etc. The program then descends into block 516 whereat it checks if the child is in the seat. If the child is not in the seat the program exits along the no path and loop. If the child is in the seat the program descends into block 518 whereat an alarm is activated and the program loops back to block 516 to repeat the action previously discussed.

As stated above the purpose of this invention is to detect when a child is left in a safety seat while the vehicle is unattended and to take corrective action to prevent injury to the child. The switch 304 (FIG. 3) of the RFID tag device 106 can be a pressure switch which is closed by the weight of the child in the safety seat. An alternative approach would be to close the switch when the safety buckle of the safety seat is engaged, as is required by law to protect the child. Of course, other techniques for closing the switch 304 can be implemented by one skilled in the art without deviating from the spirit or scope of the invention.

So long as switch 304 is open, the RFID tag device is not in a state to transmit or receive information from the RFID tag reader. Switch 304 closes when an object, such as a child, is in the safety seat 102. With the tag device 106 armed (i.e. switch 304 is closed) if the RFID reader 104 is enabled it will send out electromagnetic waves (EM waves) waves to energize to the antenna 302 of the RFID tag device. As stated above the RFID reader is enabled if the vehicle ignition switch is in the off state. With the antenna switch of the RFID tag device closed, the EM waves from the RFID reader are received as induced energy in the RFID tag device and Power up the RFID tag device. Once the RFID tag device is energized it can transmit its identifying code (ID) to the same external antenna 302 from which it has received the energizing signals. Once the RFID tag code is received by the RFID reader it indicates that an object, such as a child, is in the safety seat. The RFID reader then outputs reader return signals to the main control unit. The main control unit uses the signals to take corrective action as set forth above.

Even though the present invention has been described with references to specific embodiment this should not be construed as limitation in the scope of the invention as claimed herein. It is within the skills of one skilled in the art to make obvious adjustments and changes without deviating from the scope and sprit of the claimed invention.

What is claimed is:

1. A system for protecting children or infants from being left in a vehicle comprising:
    a safety seat in which a RFID tag is embedded, "wherein the RFID tag is coupled to a sensor that detects whether a child is buckled into the safety seat";
    a RFID tag reader operatively mounted in the cabin of said vehicle;
    a computer;
    a computer readable program installed on said computer, said computer readable program including:
        a first instruction module being responsive to first signals from sensors to activate the RFID tag reader;
        a second instruction module being responsive to second signals from the RFID tag that indicate that a child is buckled into the safety seat to wait a predetermined amount of time and, after passage of the predetermined amount of time, re-activate the RFID tag reader; and
        a third instruction module being responsive to third signals from the RFID tag that indicate that the child remains buckled into the safety seat to sound alarms indicating the child is left in vehicle and taking other actions to prevent injury to the child.

2. An apparatus, comprising:
    a main control unit that emits a first enabling signal upon receipt of an indication that an ignition of an automobile has been turned off;
    a RFID reader that receives the first enabling signal from the main control unit and generates and forwards first electromagnetic waves in response to receiving the first enabling signal;
    an RFID tag coupled to a child safety seat that is configured to receive electromagnetic waves when a sensor detects that a buckle of the child safety seat is latched, such that when the buckle is latched and the RFID tag receives the first electromagnetic signals the RFID tag emits first identification signals, and wherein:
    the RFID reader receives the first identification signals and in response thereto forwards a first indication to the main control unit that a child is retained in the child safety seat;
    in response to receiving the first indication, the main control unit waits a predetermined amount of time and transmits a second enabling signal to the RFID reader;
    in response to receiving the second enabling signal, the RFID reader generates and forwards second electromagnetic signals;
    if the buckle remains latched, the REID tag emits second identification signals;
    the RFID reader receives the second identification signals and in response thereto forwards a second indication to the main control unit that a child is retained in the child safety seat; and
    the main control unit initiates an alarm to indicate that the child is retained in the child safety seat in response to receiving both the first and the second indications.

3. The apparatus of claim 2 wherein said RFID tag is part of an RFID device that includes an antenna;
    a switch operatively coupled to the antenna; and
    a circuit module operatively coupled to said switch, wherein said circuit module if activated generates and forwards through the antenna signals including identity of said RFID device.

4. The apparatus of claim 3 further including an enabling signal that closes the switch from a normally opened position.

5. The apparatus of claim 3 wherein the switch is a pressure sensitive switch that closes from a normally opened position if the child is seated in the safety seat.

6. The apparatus of claim 4 wherein the enabling signal is generated by pressure.

7. The apparatus of claim 6 wherein the pressure results from a child being seated on a safety seat provided to accommodate said child.

8. The apparatus of claim 4 wherein the enabling signal is generated from closing of the buckle on a belt used to secure a child in a safety seat.

9. The apparatus of claim 2 wherein the RFID reader includes an antenna;
    a switch operatively coupled to said antenna; and
    RF circuit module operatively coupled to said switch.

10. The apparatus of claim 2 further including the main controller unit being responsive to signals received from said RFID reader and detection of a predefined condition generating at least one error signal signifying a need to take a corrective action to protect the child from injuries.

11. The apparatus of claim 10 wherein the corrective action includes activating an audio alarm.

12. The apparatus of claim 11 wherein the corrective action includes activating a light alarm.

13. The apparatus of claim 12 wherein the corrective action includes rolling down windows.

14. The apparatus of claim 2 further including vehicle door switch sensor for sensing if vehicle doors are opened or closed operatively coupled to said main controller unit.

15. The apparatus of claim 2 wherein the main controller unit includes a programmed microprocessor.

* * * * *